US012501262B2

(12) United States Patent
Tsai

(10) Patent No.: US 12,501,262 B2
(45) Date of Patent: Dec. 16, 2025

(54) INFORMATION SECURITY TESTING METHOD AND INFORMATION SECURITY TESTING DEVICE

(71) Applicant: INSTITUTE FOR INFORMATION INDUSTRY, Taipei (TW)

(72) Inventor: Yi-Hsueh Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 278 days.

(21) Appl. No.: 18/511,953

(22) Filed: Nov. 16, 2023

(65) Prior Publication Data

US 2025/0133398 A1 Apr. 24, 2025

(30) Foreign Application Priority Data

Oct. 20, 2023 (TW) .................................. 112140079

(51) Int. Cl.
*H04W 12/10* (2021.01)
*H04W 12/0431* (2021.01)
*H04W 12/73* (2021.01)
*H04W 76/10* (2018.01)

(52) U.S. Cl.
CPC ....... *H04W 12/0431* (2021.01); *H04W 12/10* (2013.01); *H04W 12/73* (2021.01); *H04W 76/10* (2018.02)

(58) Field of Classification Search
CPC ........... H04W 12/033; H04W 12/0431; H04W 12/10; H04W 12/106
See application file for complete search history.

(56) References Cited

U.S. PATENT DOCUMENTS

2020/0015088 A1\* 1/2020 Luo ..................... H04W 12/041

FOREIGN PATENT DOCUMENTS

WO WO2022270893 A1 12/2022

OTHER PUBLICATIONS

3GPP TS 33.501 V18.3.0, "3rd Generation Partnership Project; Technical Specification Group Services and System Aspects; Security architecture and procedures for 5G system (Release 18)", https://www.3gpp.org/ftp/Specs/archive/33_series/33.501/33501-i30.zip, Sep. 20, 2023 (Sep. 20, 2023).

(Continued)

*Primary Examiner* — Sam Bhattacharya
(74) *Attorney, Agent, or Firm* — Li & Cai Intellectual Property Office

(57) ABSTRACT

An information security testing method and an information security testing device are provided. The information security testing method and the information security testing device can obtain at least one integrity key, at least one encryption key, a Tunnel End Identifier (TEID), a first Internet Protocol (IP) address of user plane of central unit, a second IP address of distributed unit and a third IP address of user equipment from the signaling transmitted after the user equipment, base station and core network establishing the communication connection, and generate a first test packet transmitted to the user plane of the central unit to determine whether the central unit has a first security mechanism for checking the TEID, the third IP address or a first source IP address.

22 Claims, 16 Drawing Sheets

(56) References Cited

OTHER PUBLICATIONS

3GPP TR 33.926 V18.1.0, "3rd Generation Partnership Project; Technical Specification Group Services and System Aspects; Security Assurance Specification (SCAS) threats and critical assets in 3GPP network product classes (Release 18)", https://www.3gpp.org/ftp/Specs/archive/33_series/33.926/33926-i10.zip, Sep. 20, 2023 (Sep. 20, 2023).

* cited by examiner

S10

```
┌─────────────────────────────────────────────────┐
│ obtaining a base station key from a first signaling transmitted │
│ from the core network to the base station through a first       │
│ interface, and deriving at least one integrity key and at least │── S110
│ one encryption key according to the base station key            │
└─────────────────────────────────────────────────┘
                         ↓
┌─────────────────────────────────────────────────┐
│ obtaining a Tunnel End Identifier of a General Packet Radio    │
│ Service Tunneling Protocol and a first Internet Protocol       │
│ address of the user plane from a second signaling transmitted  │── S120
│ from the control plane of the central unit to the distributed  │
│ unit through a second interface                                │
└─────────────────────────────────────────────────┘
                         ↓
┌─────────────────────────────────────────────────┐
│ obtaining a second IP address of the distributed unit from a    │
│ third signaling transmitted from the distributed unit to the    │── S130
│ control plane of the central unit through the second interface  │
└─────────────────────────────────────────────────┘
                         ↓
┌─────────────────────────────────────────────────┐
│ obtaining a third IP address of the user equipment from a       │
│ fourth signaling transmitted from the control plane of the      │── S140
│ central unit to the distributed unit through the second interface│
└─────────────────────────────────────────────────┘
                         ↓
┌─────────────────────────────────────────────────┐
│ executing a first security testing procedure to generate a first│
│ test packet according to the at least one integrity key, the at │
│ least one encryption key, the TEID, the first IP address, the   │
│ second IP address and the third IP address, and transmitting    │── S150
│ the first test packet to the user plane of the central unit     │
│ through a third interface to determine whether the central unit │
│ has a first security mechanism for checking the TEID, the       │
│ third IP address or a first source IP address                   │
└─────────────────────────────────────────────────┘
                         ↓
┌─────────────────────────────────────────────────┐
│ executing a second security testing procedure to generate a     │
│ second test packet according to the at least one integrity      │
│ key, the at least one encryption key, the TEID, the first IP    │
│ address, the second IP address and the third IP address, and    │── S160
│ transmitting the second test packet to the user plane of the    │
│ central unit through the third interface to determine whether   │
│ the central unit has a second security mechanism for            │
│ executing encryption protection or integrity protection         │
└─────────────────────────────────────────────────┘
```

FIG. 2

INFORMATION SECURITY TESTING METHOD AND INFORMATION SECURITY TESTING DEVICE

CROSS-REFERENCE TO RELATED PATENT APPLICATION

This application claims the benefit of priority to Taiwan Patent Application No. 112140079, filed on Oct. 20, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE PRESENT DISCLOSURE

The present disclosure relates to an information security testing method and an information security testing device, and more particularly to an information security testing method and an information security testing device that can target a central unit of a base station.

BACKGROUND OF THE PRESENT DISCLOSURE

In the Open Radio Access Network (O-RAN) architecture, a base station may include a distributed unit and a central unit. In addition, the existing information security testing method is to generate a random Tunnel End Identifier (TEID) and a random Internet Protocol (IP) address, and to test whether the central unit of the base station has a security mechanism for checking the TEID and the IP address by the random TEID and the random IP address.

In this case, the existing information security testing method lacks testing efficiency and blindly attacks the central unit of the base station, so that it is impossible to accurately determine whether the central unit has a security mechanism for checking the TEID or the IP address, and it is not possible to test the central unit's alertness and integrity protection capabilities.

SUMMARY OF THE PRESENT DISCLOSURE

In response to the above-referenced technical inadequacies, the present disclosure provides an information security testing method and an information security testing device in view of the shortcomings of the existing technology, which can obtain the TEID and the IP address of legitimate user, and use the obtained TEID and IP address to test whether the central unit has a security mechanism for checking the TEID or the IP address.

In order to solve the above-mentioned problems, one of the technical aspects adopted by the present disclosure is to provide an information security testing method. The information security testing method is executed by an information security testing device after establishing a communication connection between a user equipment, a base station and a core network, and includes following steps: obtaining a base station key from a first signaling transmitted from the core network to the base station through a first interface, and deriving at least one integrity key and at least one encryption key according to the base station key, in which the base station includes a distributed unit (DU) and a central unit (CU), and the CU includes a control plane and a user plane; obtaining a Tunnel End Identifier (TEID) of a General Packet Radio Service (GPRS) Tunneling Protocol (GTP) and a first internet protocol (IP) address of the user plane from a second signaling transmitted from the control plane of the CU to the DU through a second interface; obtaining a second IP address of the DU from a third signaling transmitted from the DU to the control plane of the CU through the second interface; obtaining a third IP address of the UE from a fourth signaling transmitted from the control plane of the CU to the DU through the second interface; and executing a first security testing procedure to generate a first test packet according to the at least one integrity key, the at least one encryption key, the TEID, the first IP address, the second IP address and the third IP address, and transmitting the first test packet to the user plane of the CU through a third interface to determine whether the CU has a first security mechanism for checking the TEID, the third IP address or a first source IP address.

In order to solve the above-mentioned technical problems, another one of the technical aspects adopted by the present disclosure is to provide an information security testing device including a packet capturer and a processing circuit. The packet capturer is configured to execute following steps after establishing a communication connection between a UE, a base station and a core network: obtaining a base station key from a first signaling transmitted from the core network to the base station through a first interface, and deriving at least one integrity key and at least one encryption key according to the base station key, in which the base station includes a distributed unit (DU) and a central unit (CU), and the CU includes a control plane and a user plane; obtaining a Tunnel End Identifier (TEID) of a General Packet Radio Service (GPRS) Tunneling Protocol (GTP) and a first internet protocol (IP) address of the user plane from a second signaling transmitted from the control plane of the CU to the DU through a second interface; obtaining a second IP address of the DU from a third signaling transmitted from the DU to the control plane of the CU through the second interface; and obtaining a third IP address of the UE from a fourth signaling transmitted from the control plane of the CU to the DU through the second interface. The processing circuit is coupled to the packet capturer and configured to execute a first security testing procedure to generate a first test packet according to the at least one integrity key, the at least one encryption key, the TEID, the first IP address, the second IP address and the third IP address and transmit the first test packet to the user plane of the CU through a third interface to determine whether the CU has a first security mechanism for checking the TEID and the third IP address or a first source IP address.

These and other aspects of the present disclosure will become apparent from the following description of the embodiment taken in conjunction with the following drawings and their captions, although variations and modifications therein may be affected without departing from the spirit and scope of the novel concepts of the present disclosure.

BRIEF DESCRIPTION OF THE DRAWINGS

The described embodiments may be better understood by reference to the following description and the accompanying drawings, in which:

FIG. 2 is a flow chart of the information security testing method according to the embodiment of the present disclosure;

DETAILED DESCRIPTION OF THE EXEMPLARY EMBODIMENTS

Figure 1:
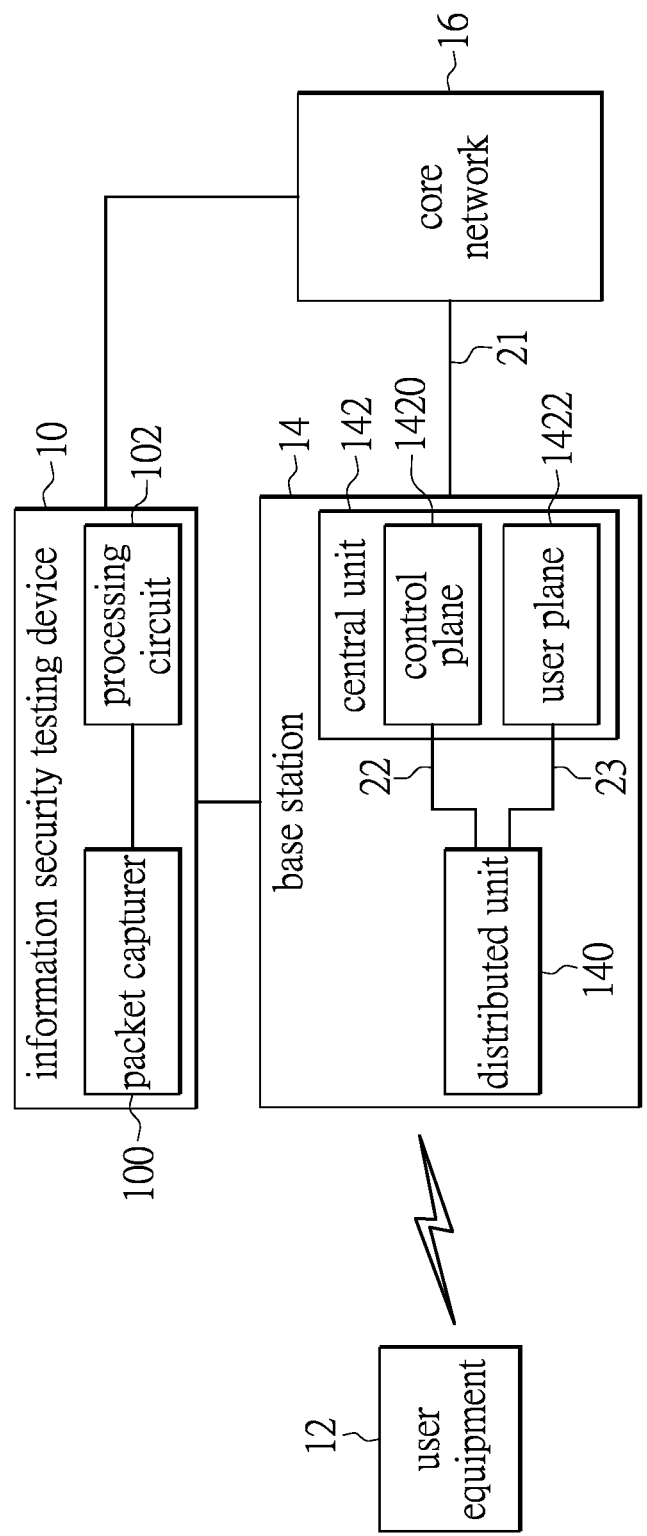
FIG. 1 is a functional block diagram of the information security testing device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1 and FIG. 2. FIG. 1 is a functional block diagram of the information security testing device according to an embodiment of the present disclosure, and FIG. 2 is a flow chart of the information security testing method according to the embodiment of the present disclosure. As shown in FIG. 1, the information security testing device 10 of this embodiment can be coupled to the base station 14 and the core network 16, and includes the packet capturer 100 and the processing circuit 102.

The packet capturer 100 is a hardware device that can capture and analyze signals transmitted on interfaces, such as Test Access Points (TAPs). However, the present disclosure does not limit the specific implementation of the packet capturer 100. In addition, the processing circuit 102 is coupled to the packet capturer 100 and can be implemented by hardware (such as a central processing unit and a memory) combined with software and/or firmware, but the present disclosure does not limit the specific implementation of the processing circuit 102.

In this embodiment, the base station 14 and the core network 16 can transmit signals through the first interface 21, and the base station 14 is a base station having the O-RAN architecture. Therefore, the base station 14 includes the distributed unit 140 and the central unit 142, and the central unit 142 includes the control plane 1420 and the user plane 1422. In addition, the control plane 1420 of the distributed unit 140 and the central unit 142 can transmit signals through the second interface 22 (i.e., F1-C interface), and the user plane 1422 of the distributed unit 140 and the central unit 142 can transmit signals through the third interface 23 (i.e., F1-C interface). As shown in FIG. 2, the information security testing method of this embodiment can be executed by the information security testing device 10 after establishing a communication connection between the user equipment 12, the base station 14 and the core network 16, and includes the following steps.

S110: obtaining a base station key from a first signaling transmitted from the core network to the base station through a first interface, and deriving at least one integrity key and at least one encryption key according to the base station key;

S120: obtaining a Tunnel End Identifier (TEID) of a General Packet Radio Service (GPRS) Tunneling Protocol (GPT) and a first Internet Protocol (IP) address of the user plane from a second signaling transmitted from the control plane of the central unit (CU) to the distributed unit (DU) through a second interface;

S130: obtaining a second IP address of the DU from a third signaling transmitted from the DU to the control plane of the CU through the second interface;

S140: obtaining a third IP address of the user equipment (UE) from a fourth signaling transmitted from the control plane of the CU to the DU through the second interface; and S150: executing a first security testing procedure to generate a first test packet according to the at least one integrity key, the at least one encryption key, the TEID, the first IP address, the second IP address and the third IP address, and transmitting the first test packet to the user plane of the CU through a third interface to determine whether the CU has a first security mechanism for checking the TEID, the third IP address or a first source IP address.

Figure 3:
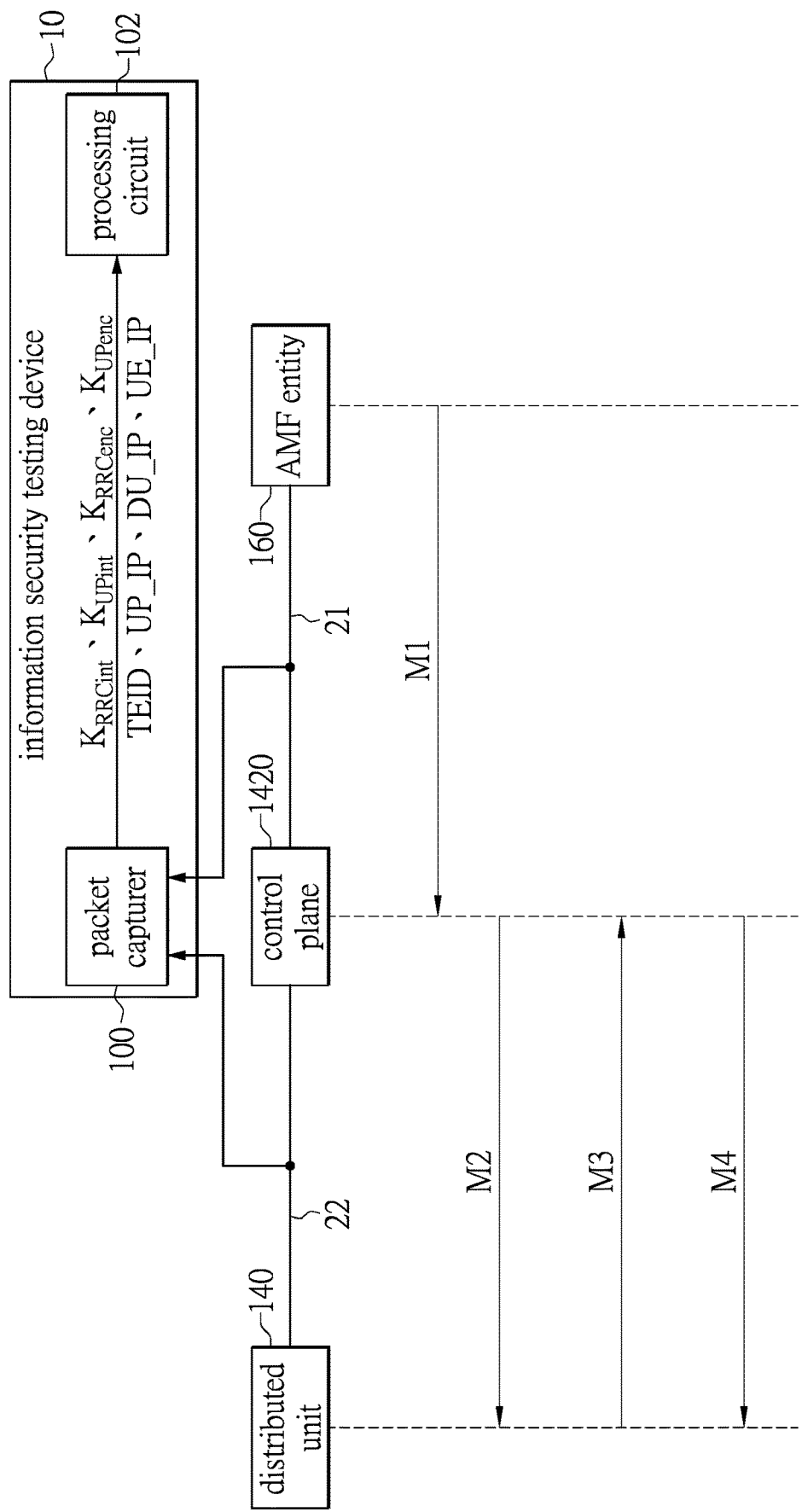
FIG. 3 is a schematic diagram of the packet capturer of the information security testing device configured to execute the first test parameter acquisition procedure according to an embodiment of the present disclosure.

To facilitate the following description, the above S110 to S140 may be defined as the first test parameter acquisition procedure, and the packet capturer 100 of the information security testing device 10 may be configured to execute the first test parameter acquisition procedure after establishing the communication connection between the user equipment 12, the base station 14 and the core network 16. Reference is made to FIG. 3. FIG. 3 is a schematic diagram of the packet capturer of the information security testing device configured to execute the first test parameter acquisition procedure according to an embodiment of the present disclosure. It should be noted that, for the signals transmitted on the interface, this embodiment will display them under the interface in order.

As shown in FIG. 3, in order to correspond to the base station 14 of the O-RAN architecture, the core network 16 includes an Access and Mobility Function (AMF) entity 160 and a User Plane Function (UPF) entity 162 (not shown in FIG. 3). Therefore, after the user equipment 12, the base station 14 and the core network 16 establish a communication connection, the packet capturer 100 may be configured to obtain the base station key $K_{gNB}$ from the first signaling M1 of the control plane 1420 transmitted from the AMF entity 160 of the core network 16 to the control plane 1420 of the central unit 142 through the first interface 21 (e.g., N2 interface) (not shown in FIG. 3), and the packet capturer 100 can derive the first integrity key $K_{RRCint}$, the second integrity key $K_{UPint}$, the first encryption key $K_{RRCenc}$ and the second encryption key $K_{UPenc}$ according to the base station key $K_{gNB}$. For example, the packet capturer 100 can use a Key Derivation Function (KDF) to derive the first integrity key $K_{RRCint}$, the second integrity key $K_{UPint}$, the first encryption key $K_{RRCenc}$ and the second encryption key $K_{UPenc}$ according to the base station key $K_{gNB}$.

In this embodiment, the first signaling M1 may be, for example, an Initial Context Setup Request signaling whose content includes the base station key $K_{gNB}$, but the present disclosure is not limited thereto. In addition, the technical means of deriving the first integrity key $K_{RRCint}$, the second integrity key $K_{UPint}$, the first encryption key $K_{RRCenc}$ and the second encryption key $K_{UPenc}$ according to the base station key $K_{gNB}$ is already well known to those skilled in the art, and the details will not be described again.

Then, the packet capturer 100 may be configured to obtain the TEID of the GTP and the first IP address UP_IP of the user plane 1422 from the second signaling M2 transmitted from the control plane 1420 of the central unit 142 to the distributed unit 140 through the second interface 22 (i.e., the F1-C interface), and obtain the second IP address DU_IP of the distributed unit 140 from the third signaling M3 transmitted from the distributed unit 140 to the control plane 1420 of the central unit 142 through the second interface 22.

In this embodiment, the second signaling M2 may be, for example, a UE Context Setup Request signaling of the user equipment whose content includes the TEID and the first IP address UP_IP, and the third signaling M3 may be, for example, a UE Context Setup Response signaling of the user equipment whose content includes the second IP address UP_IP, but the present disclosure is not limited thereto. It should be noted that since the user equipment 12, the base station 14 and the core network 16 have established the communication connection at this time, the TEID obtained by the packet capturer 100 can also be called the TEID of the legitimate user.

Furthermore, the packet capturer 100 may be configured to obtain the third IP address UE_IP of the user equipment 12 from the fourth signaling M4 transmitted from the control plane 1420 of the central unit 142 to the distributed unit 140 through the second interface 22. In addition, in response to receiving the first integrity key $K_{RRCint}$, the second integrity key $K_{UPint}$, the first encryption key $K_{RRCenc}$, the second encryption key $K_{UPenc}$, TEID, the first IP address UP_IP, the second IP address DU_IP and the third IP address UE_IP obtained by the packet capturer 100, the processing circuit 102 may be configured to execute the first security testing procedure.

In this embodiment, the fourth signaling M4 may be, for example, a Protocol Data Unit (PDU) Session Establishment Accept signaling whose content includes the third IP address UE_IP. However, the present disclosure is not limited thereto. Similarly, since the user equipment 12, the base station 14 and the core network 16 have established the communication connection at this time, the third IP address UE_IP obtained by the packet capturer 100 can also be called the IP address of the legitimate user.

It can be seen that compared with the prior art, the information security testing method and the information security testing device 10 of this embodiment can obtain the TEID and the IP address of the legitimate user (i.e., the third IP address UE_IP). In addition, for the central unit 142, the second IP address DU_IP of the distributed unit 140 may also be called the first source IP address S1_IP (not shown in the figures), and the central unit 142 may also have the first security mechanism for checking the first source IP address S1_IP.

Figure 4:
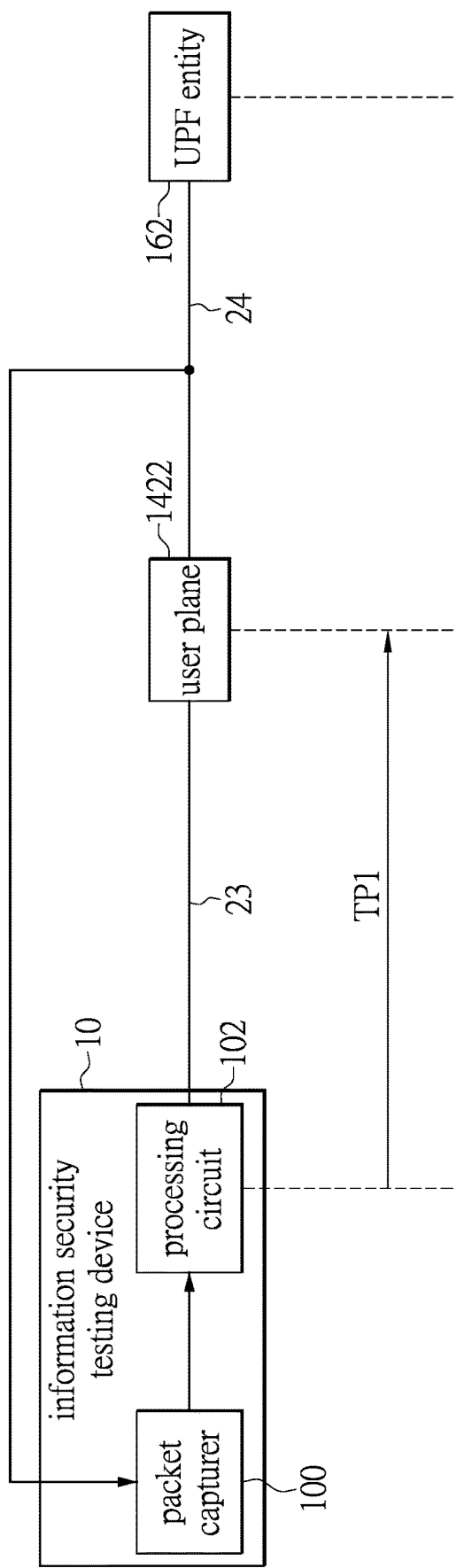
FIG. 4 is a schematic diagram of the processing circuit of the information security testing device configured to execute the first security testing procedure according to an embodiment of the present disclosure.

Therefore, the processing circuit 102 can test whether the central unit 142 has the first security mechanism for checking the TEID, the third IP address UE_IP or the first source IP address S1_IP by tampering with the TEID, the third IP address UE_IP or the second IP address DU_IP obtained by the packet capturer 100. To facilitate the following description, the TEID, the third IP address UE_IP and the second IP address DU_IP obtained by the packet capturer 100 may be defined as a plurality of first test parameters. Reference is made to FIG. 4. FIG. 4 is a schematic diagram of the processing circuit of the information security testing device configured to execute the first security testing procedure according to an embodiment of the present disclosure.

As shown in FIG. 4, after tampering with one of the first test parameters, the processing circuit 102 can generate the first test packet TP1 having encryption and integrity protection according to the first integrity key $K_{RRCint}$, the second integrity key $K_{UPint}$, the first encryption key $K_{RRCenc}$ and the second encryption key $K_{UPenc}$, and the content of the first test packet TP1 includes a tempered first test parameter (hereinafter referred to as the first target test parameter) and other untampered first test parameters. For example, the processing circuit 102 may use an encryption protection algorithm and an integrity protection algorithm to generate the first test packet TP1 having encryption and integrity protection according to the aforementioned keys. In addition, the processing circuit 102 can transmit the first test packet TP1 to the user plane 1422 of the central unit 142 through the third interface 23 (i.e., the F1-U interface) according to the first IP address UP_IP.

Next, the processing circuit 102 may determine whether the user plane 1422 of the central unit 142 transmits the first test packet TP1 to the UPF entity 162 of the core network 16 through the fourth interface 24 (i.e., the N3 interface). In response to determining that the user plane 1422 of the central unit 142 does not transmit the first test packet TP1 to the UPF entity 162 of the core network 16 through the fourth interface 24, the processing circuit 102 may determine that the central unit 142 has the first security mechanism for checking the first target test parameter.

Specifically, the processing circuit 102 can capture and analyze the signal transmitted on the fourth interface 24 through the packet capturer 100 to determine whether the user plane 1422 transmits the first test packet TP1 to the UPF entity 162 through the fourth interface 24. However, the present disclosure does not limit the specific implementation in which the processing circuit 102 determines whether the user plane 1422 transmits the first test packet TP1 to the UPF entity 162 through the fourth interface 24.

Figure 5:
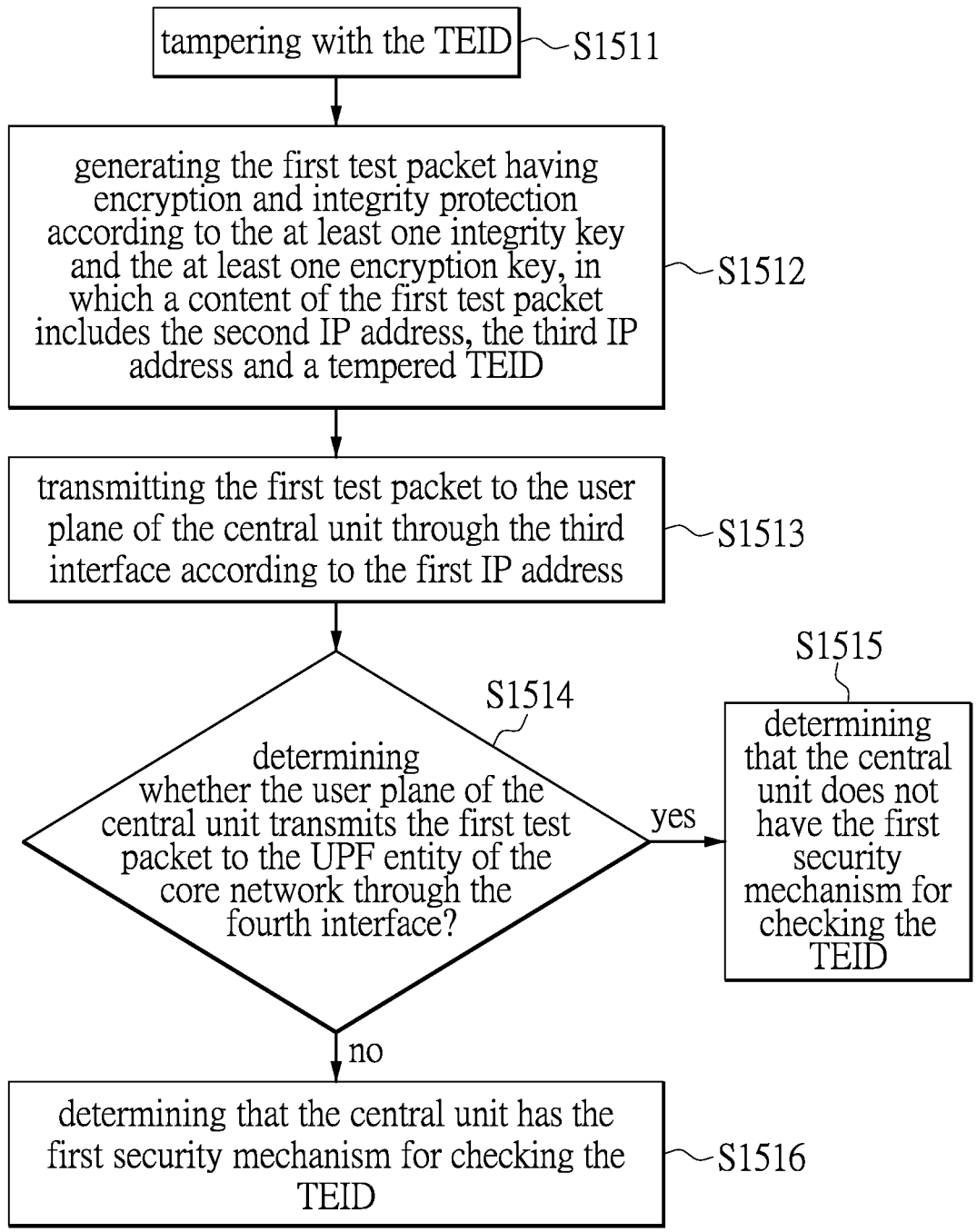
FIG. 5 is a flow chart of the first security testing procedure according to the first embodiment of the present disclosure.

Further, Reference is made to FIG. 5, which is a flow chart of the first security testing procedure according to the first embodiment of the present disclosure. As shown in FIG. 5, when the processing circuit 102 chooses to tamper with the TEID obtained by the packet capturer 100 (that is, the TEID of the legitimate user), the first security testing procedure of this embodiment may include the following steps.

S1511: tampering with the TEID;
    S1512: generating the first test packet having encryption and integrity protection according to the at least one integrity key and the at least one encryption key, in which a content of the first test packet includes the second IP address, the third IP address and a tampered TEID;
    S1513: transmitting the first test packet to the user plane of the CU through the third interface according to the first IP address;
    S1514: determining whether the user plane of the CU transmits the first test packet to the UPF entity of the core network through the fourth interface; if yes, the first security testing procedure of this embodiment enters S1515; if not, the first security testing procedure of this embodiment proceeds to S1516.
    S1515: determining that the CU does not have the first security mechanism for checking the TEID; and
    S1516: determining that the CU has the first security mechanism for checking the TEID. Since the relevant details are as mentioned above, they will not be repeated here.

Figure 6:
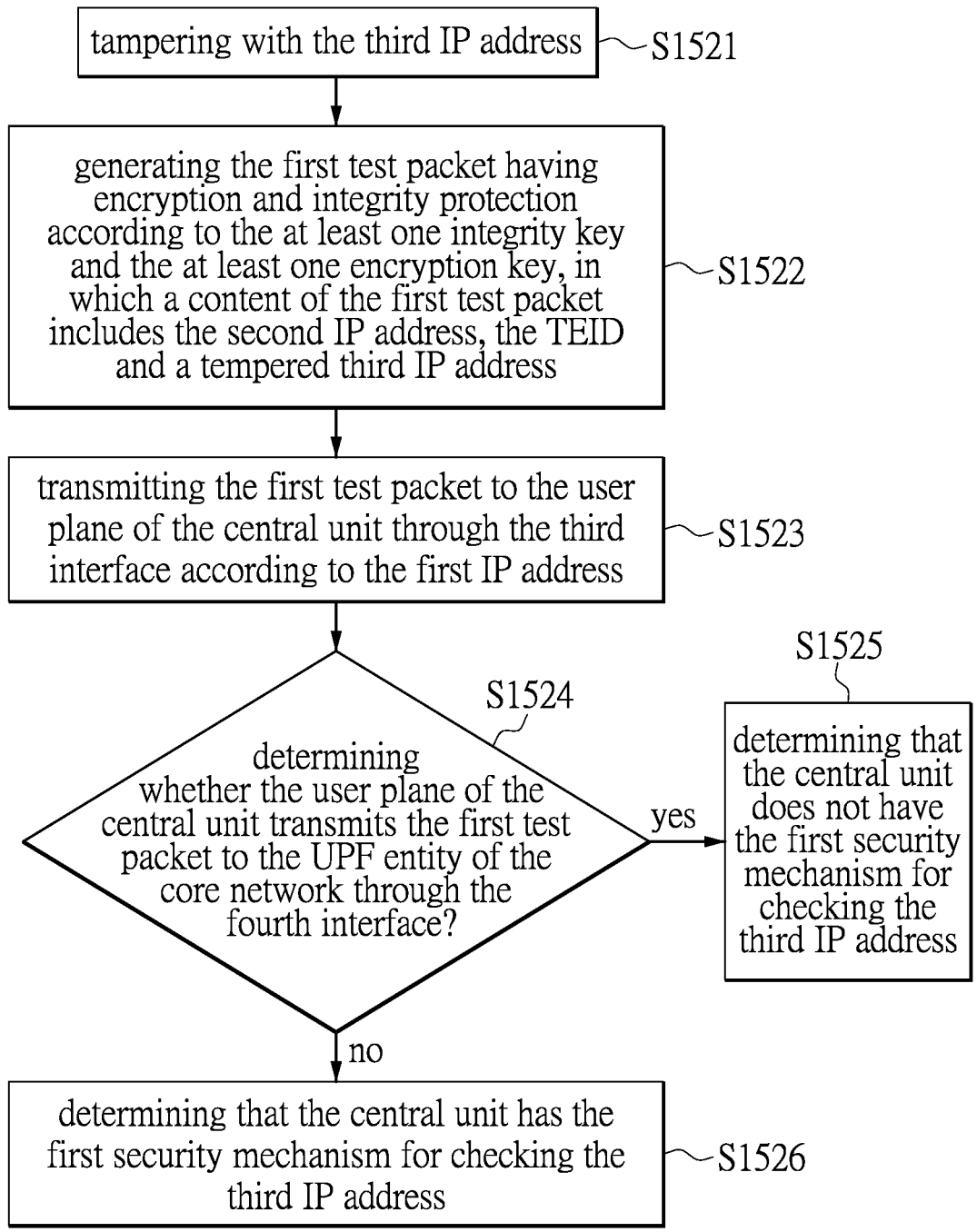
FIG. 6 is a flow chart of the first security testing procedure according to the second embodiment the present disclosure.

Further, reference is made to FIG. 6. FIG. 6 is a flow chart of the first security testing procedure according to the second embodiment of the present disclosure. As shown in FIG. 6, in the case where the processing circuit 102 chooses to tamper with the third IP address UE_IP (that is, the IP address of the legitimate user) obtained by the packet capturer 100, the first security testing procedure of this embodiment may include the following steps.

S1521: tampering with the third IP address;
    S1522: generating the first test packet having encryption and integrity protection according to the at least one integrity key and the at least one encryption key, in which a content of the first test packet includes the second IP address, the TEID and a tempered third IP address;
    S1523: transmitting the first test packet to the user plane of the CU through the third interface according to the first IP address;
    S1524: determining whether the user plane of the CU transmits the first test packet to the UPF entity of the core network through the fourth interface; if yes, the first security testing procedure of this embodiment enters S1525; if not, the first security testing procedure of this embodiment proceeds to S1526.
    S1525: determining that the CU does not have the first security mechanism for checking the third IP address; and
    S1526: determining that the CU has the first security mechanism for checking the third IP address. Since the relevant details are the same as those mentioned above, they will not be repeated here.

Figure 7:
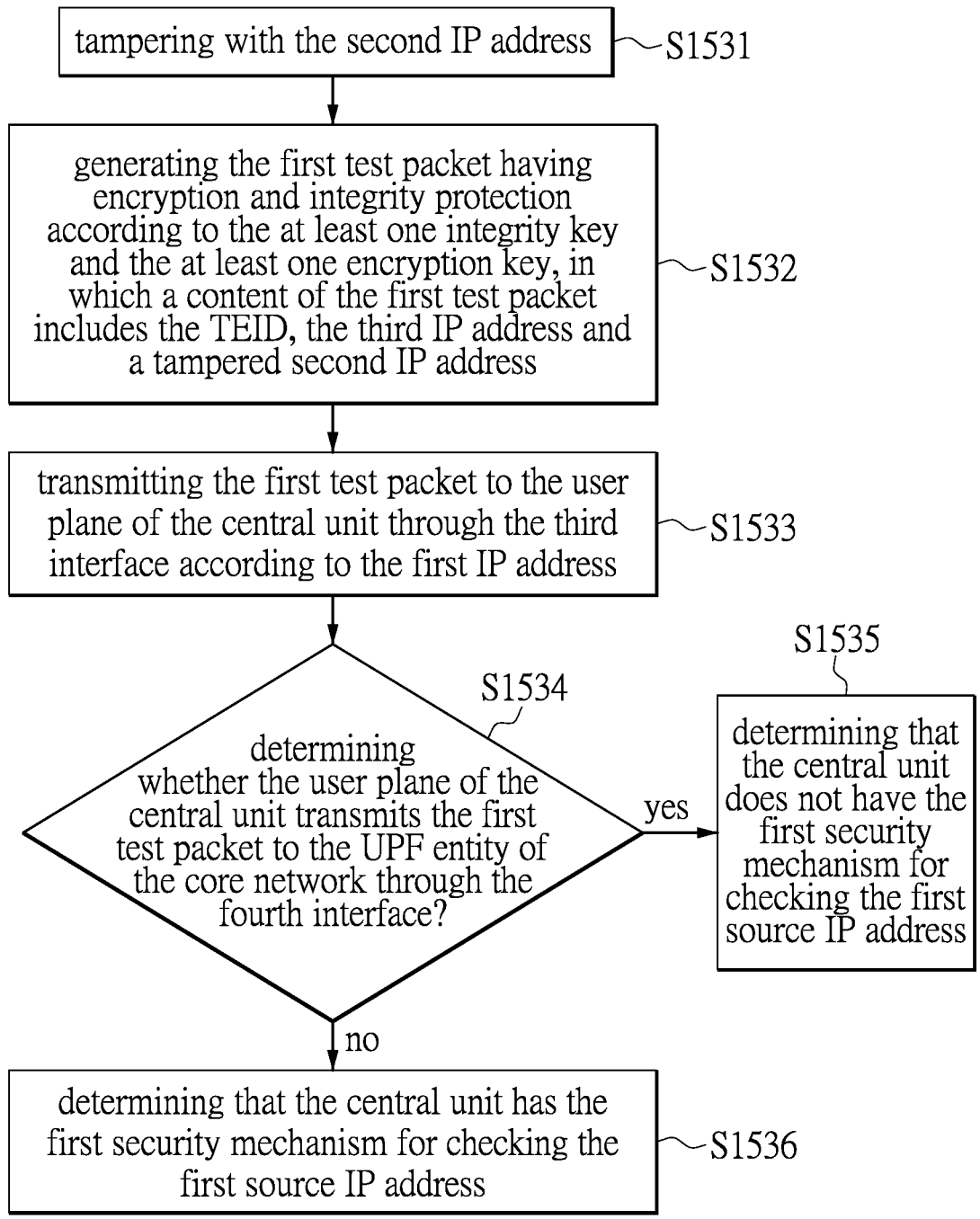
FIG. 7 is a flow chart of the first security testing procedure according to the third embodiment of the present disclosure.

Similarly, reference is made to FIG. 7, which is a flow chart of the first security testing procedure according to the third embodiment of the present disclosure. As shown in FIG. 7, in the case where the processing circuit 102 chooses to tamper with the second IP address DU_IP (i.e., the first source IP address S1_IP) obtained by the packet capturer 100, the first security testing procedure of this embodiment may include the following steps.

S1531: tampering with the second IP address;
    S1532: generating the first test packet having encryption and integrity protection according to the at least one integrity key and the at least one encryption key, in which a content of the first test packet includes the TEID, the third IP address and a tampered second IP address;
    S1533: transmitting the first test packet to the user plane of the CU through the third interface according to the first IP address;
    S1534: determining whether the user plane of the CU transmits the first test packet to the UPF entity of the core network through the fourth interface; if yes, the first security testing procedure of this embodiment enters S1535; if not, the first security testing procedure of this embodiment proceeds to S1536.
    S1535: determining that the CU does not have the first security mechanism for checking the first source IP address; and
    S1536: determining that the CU has the first security mechanism for checking the first source IP address. Since the relevant details are the same as those mentioned above, they will not be repeated here.

It should be noted that in other embodiments, the processing circuit 102 may also execute the first security testing procedures of FIG. 5, FIG. 6 and FIG. 7 in turn, and then determine whether the central unit 142 has the first security mechanism for checking the TEID, the third IP address UE_IP and the first source IP address S1_IP.

Further, as shown in FIG. 2, in order to also test the alertness and integrity protection functions of the central unit 142, the information security testing method of this embodiment may also include the following steps.

S160: executing a second security testing procedure to generate a second test packet according to the at least one integrity key, the at least one encryption key, the TEID, the first IP address, the second IP address and the third IP address, and transmitting the second test packet to the user plane of the CU through the third interface to determine whether the CU has a second security mechanism for executing encryption protection or integrity protection.

Figure 8:
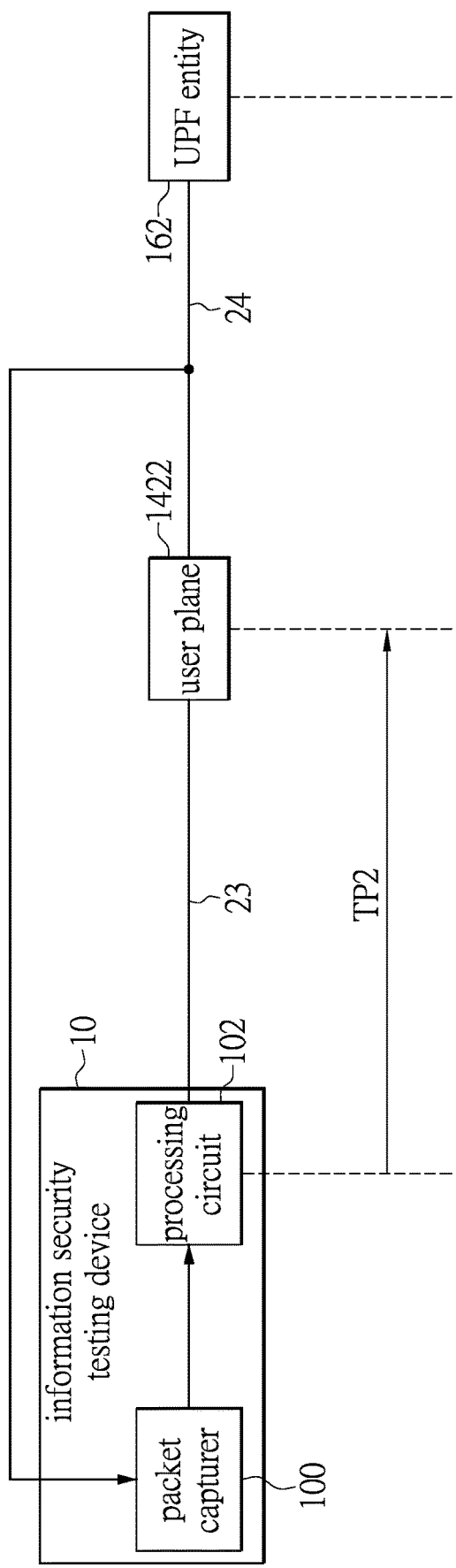
FIG. 8 is a schematic diagram of the processing circuit of the information security testing device configured to execute the second security testing procedure according to an embodiment of the present disclosure.

For the convenience of the following description, the above S110 to S160 may be simply referred to as S10. Reference is made to FIG. 8, which is a schematic diagram of the processing circuit of the information security testing device configured to execute the second security testing procedure according to an embodiment of the present disclosure. As shown in FIG. 8, the processing circuit 102 can generate the second test packet TP2 having encryption and non-integrity protection or the second test packet TP2 having non-encryption and integrity protection according to the first integrity key $K_{RRCint}$, the second integrity key $K_{UPint}$, the first encryption key $K_{RRCenc}$ and the second encryption key $K_{UPenc}$, and the content of the second test packet TP2 includes the second IP address DU_IP, the TEID and the third IP address UE_IP. In addition, the processing circuit 102 may transmit the second test packet TP2 to the user plane 1422 of the central unit 142 through the third interface 23 (i.e., the F1-U interface) according to the first IP address UP_IP.

Next, the processing circuit 102 may determine whether the user plane 1422 of the central unit 142 transmits the second test packet TP2 to the UPF entity 162 of the core network 16 through the fourth interface 24 (i.e., the N3 interface). In response to determining that the user plane 1422 of the central unit 142 does not transmit the second test packet TP2 to the UPF entity 162 of the core network 16 through the fourth interface 24, the processing circuit 102 may determine that the central unit 142 has the second security mechanism for executing encryption protection or integrity protection.

Figure 9:
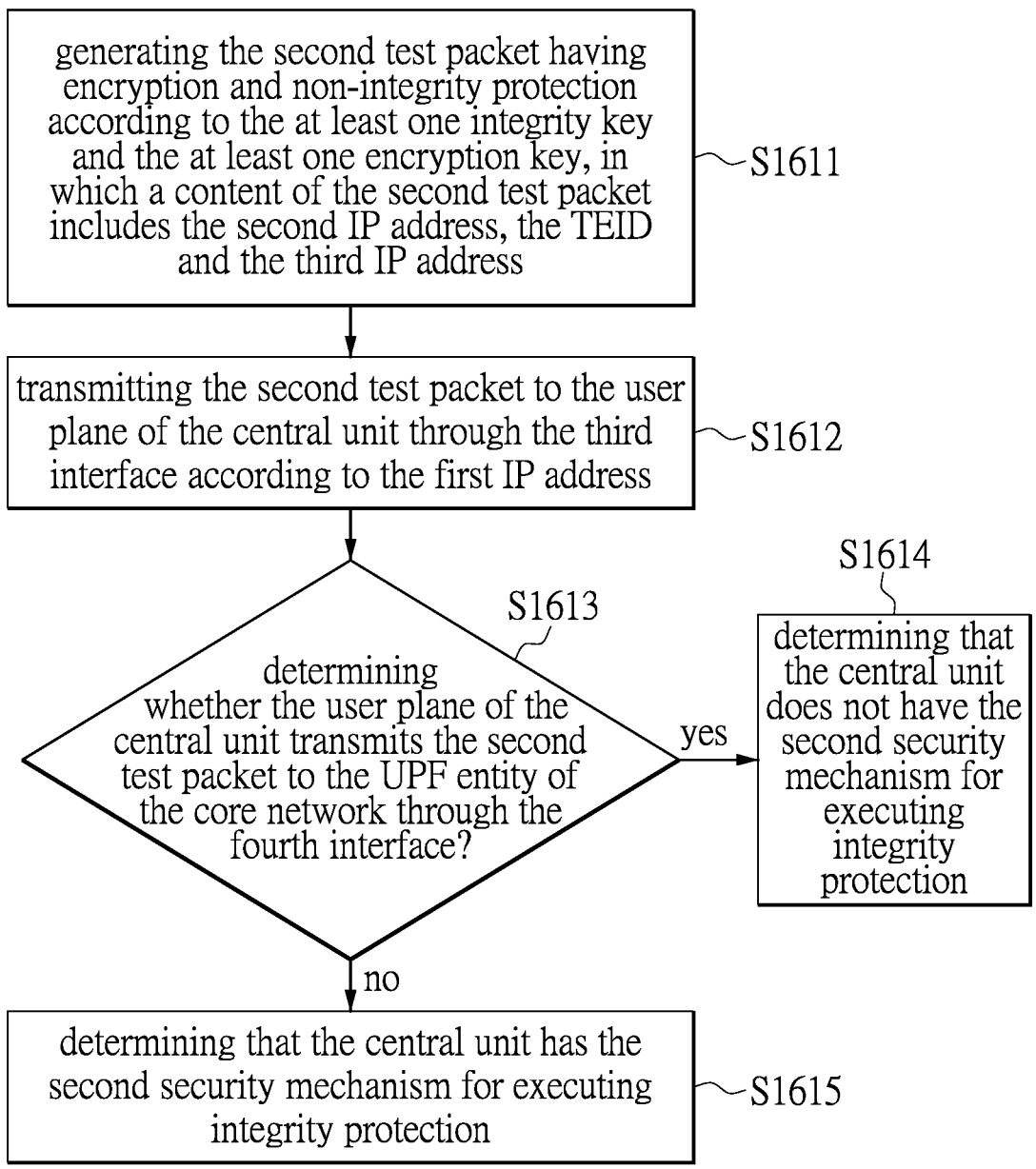
FIG. 9 is a flow chart of the second security testing procedure according to the first embodiment of the present disclosure.

Further, reference is made to FIG. 9, which is a flow chart of the second security testing procedure according to the first embodiment of the present disclosure. As shown in FIG. 9, in the case where the processing circuit 102 generates the second test packet TP2 having encryption and non-integrity protection, the second security testing procedure of this embodiment may include the following steps.

S1611: generating the second test packet having encryption and non-integrity protection according to the at least one integrity key and the at least one encryption key, in which a content of the second test packet includes the second IP address, the TEID and the third IP address;

S1612: transmitting the second test packet to the user plane of the CU through the third interface according to the first IP address;

S1613: determining whether the user plane of the CU transmits the second test packet to the UPF entity of the core network through the fourth interface; if yes, the second security testing procedure of this embodiment enters S1614; if not, the second security testing procedure of this embodiment proceeds to S1615.

S1614: determining that the CU does not have the second security mechanism for executing integrity protection; and S1615: determining that the CU has the second security mechanism for executing integrity protection.

Figure 10:
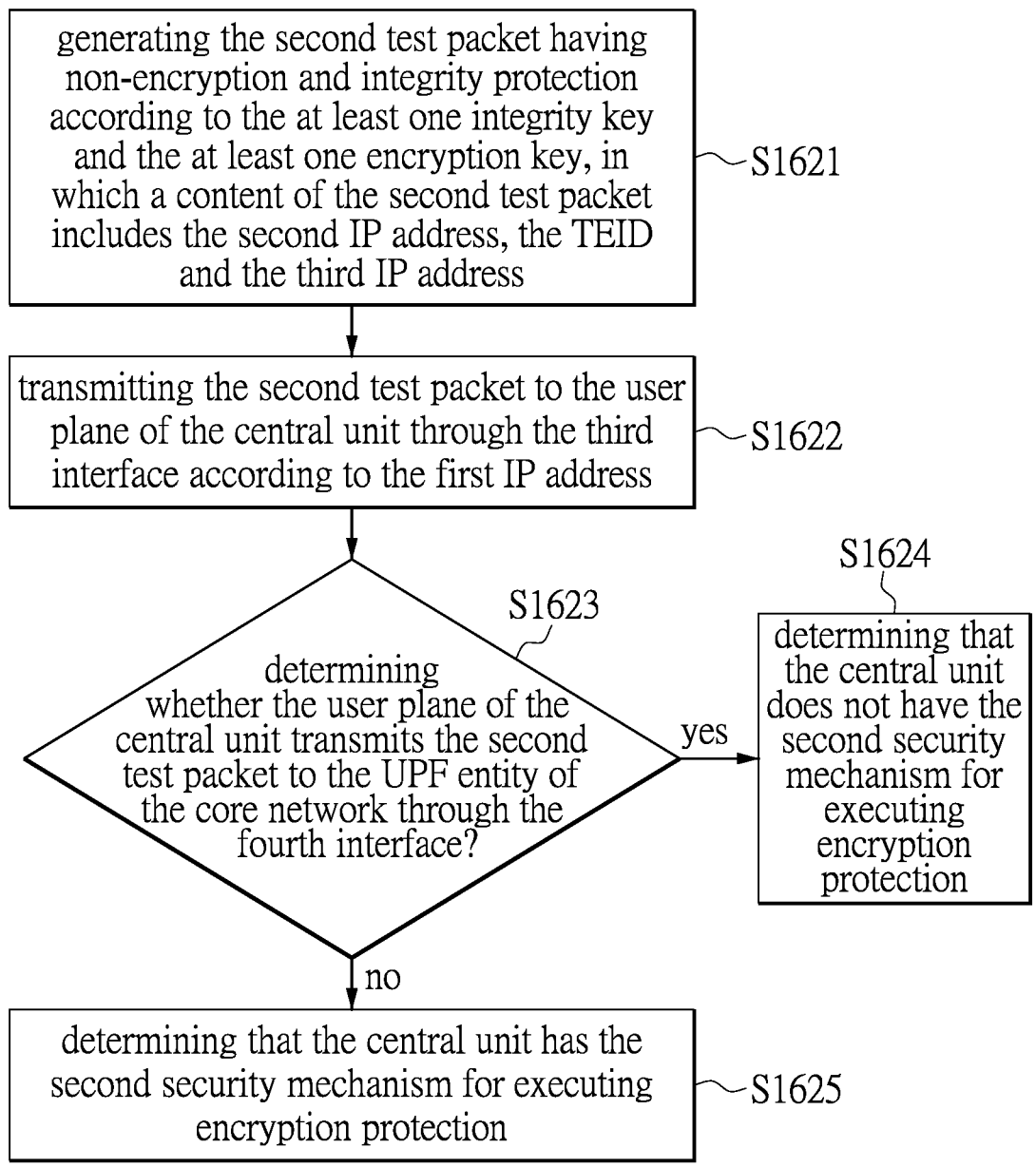
FIG. 10 is a flow chart of the second security testing procedure according to the second embodiment of the present disclosure.

In addition, reference is made to FIG. 10, which is a flow chart of the second security testing procedure of the second embodiment of the present disclosure. As shown in FIG. 10, in the case where the processing circuit 102 generates the second test packet TP2 having non-encryption and integrity protection, the second security testing procedure of this embodiment may include the following steps.

S1621: generating the second test packet having non-encryption and integrity protection according to the at least one integrity key and the at least one encryption key, in which a content of the second test packet includes the second IP address, the TEID and the third IP address;

S1622: transmitting the second test packet to the user plane of the CU through the third interface according to the first IP address;

S1623: determining whether the user plane of the CU transmits the second test packet to the UPF entity of the core network through the fourth interface; if yes, the second security testing procedure of this embodiment enters S1624; if not, the second security testing procedure of this embodiment proceeds to S1625.

S1624: determining that the CU does not have the second security mechanism for executing encryption protection; and S1625: determining that the CU has the second security mechanism for executing encryption protection.

Similarly, in other embodiments, the processing circuit 102 may also execute the second security testing procedure of FIG. 9 and FIG. 10 in turn to determine whether the central unit 142 has the second security mechanism for executing encryption protection and integrity protection.

Further, in addition to the central unit 142 of the base station 14, the information security testing device 10 of this embodiment can also execute the information security testing on the UPF entity 162 of the core network 16. Therefore, reference is made to FIG. 11, which is a flow chart of the information security testing method according to the second embodiment of the present disclosure, and the similarities between FIG. 11 and FIG. 2 will not be described again.

Figure 11:
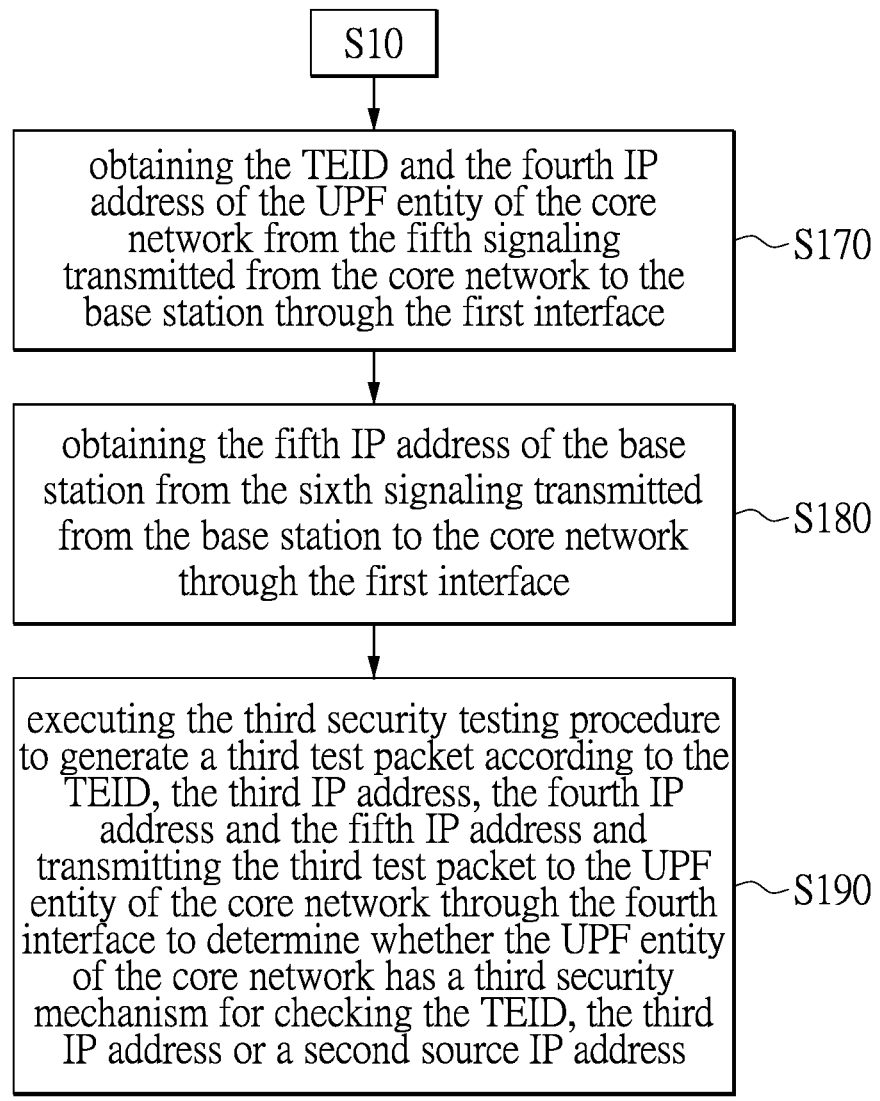
FIG. 11 is a flow chart of the information security testing method according to the second embodiment of the present disclosure.

As shown in FIG. 11, compared to FIG. 2, the information security testing method of this embodiment may further include the following steps.

S170: obtaining the TEID and the fourth IP address of the UPF entity of the core network from the fifth signaling transmitted from the core network to the base station through the first interface;

S180: obtaining the fifth IP address of the base station from the sixth signaling transmitted from the base station to the core network through the first interface; and S190: executing the third security testing procedure to generate a third test packet according to the TEID, the third IP address, the fourth IP address and the fifth IP address and transmitting the third test packet to the UPF entity of the core network through the fourth interface to determine whether the UPF entity of the core network has a third security mechanism for checking the TEID, the third IP address or a second source IP address.

Figure 12:
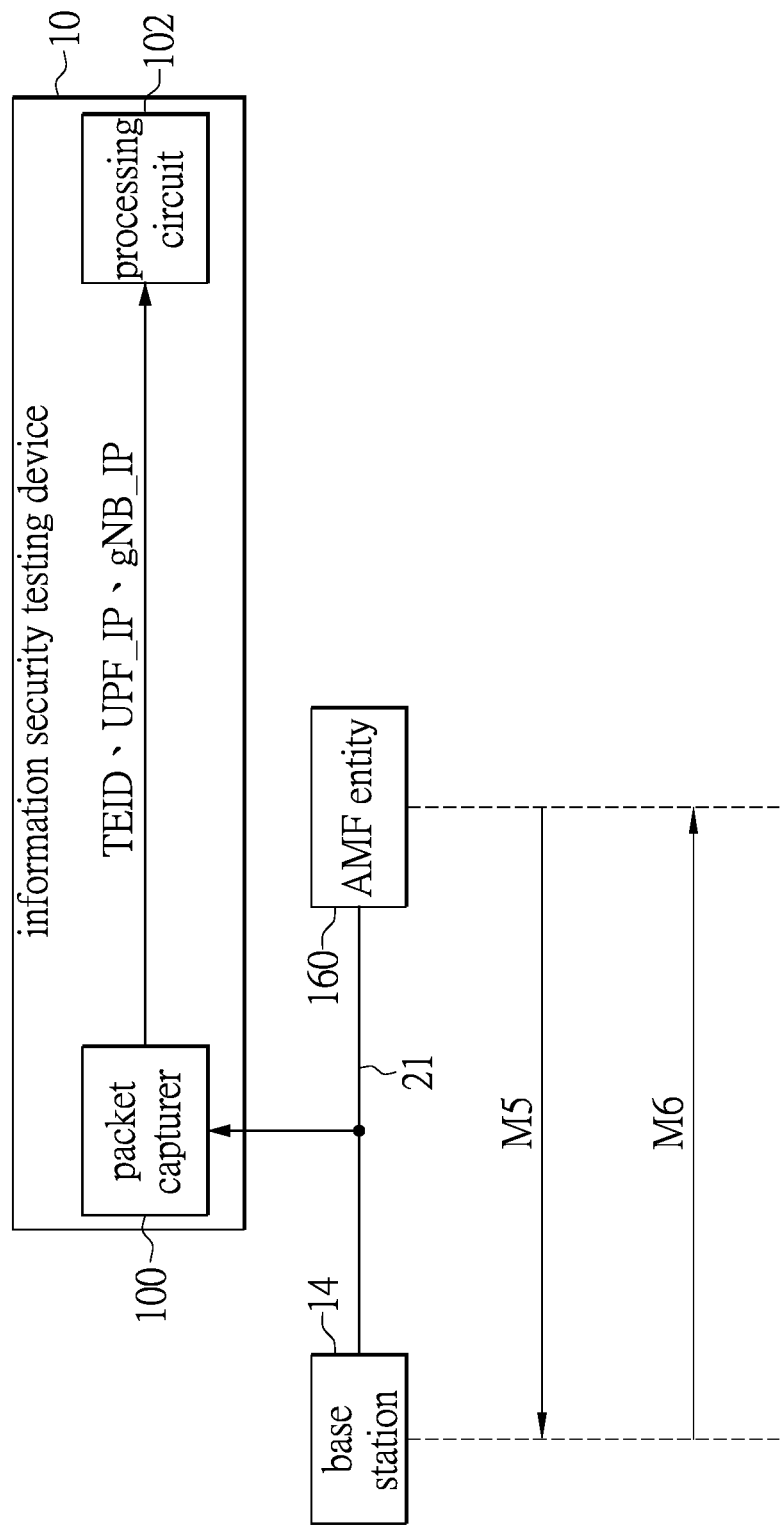
FIG. 12 is a schematic diagram of the packet capturer of the information security testing device configured to execute the second test parameter acquisition procedure according to an embodiment of the present disclosure.

To facilitate the following description, the above-mentioned S170 to S180 may be defined as the second test parameter acquisition procedure, and the packet capturer 100 of the information security testing device 10 may be configured to execute the second test parameter acquisition procedure. Reference is made to FIG. 12. FIG. 12 is a schematic diagram of the packet capturer of the information security testing device configured to execute the second test parameter acquisition procedure according to an embodiment of the present disclosure.

As shown in FIG. 12, the packet capturer 100 may be configured to obtain the TEID and the fourth IP address UPF_IP of the UPF entity 162 of the core network 16 from the fifth signaling M5 transmitted from the AMF entity 160 of the core network 16 to the base station 14 through the first interface 21 (e.g., N2 interface), and obtain the fifth IP address gNB_IP of the base station 14 from the sixth signaling M6 transmitted from the base station 14 to the AMF entity 160 of the core network 16 through the first interface.

In this embodiment, the fifth signaling M5 may be, for example, a PDU Session Resource Setup Request signaling whose content includes the TEID and the fourth IP address UPF_IP, and the sixth signaling M6 may be, for example, a PDU Session Resource Setup Response signaling whose content includes the fifth IP address gNB_IP, but the present disclosure is not limited thereto. In addition, for the UPF entity 162 of the core network 16, the fifth IP address gNB_IP of the base station 14 may also be called the second source IP address S2_IP (not shown in the figures), and the UPF entity 162 of the core network 16 may have a third security mechanism for checking the second source IP address S2_IP.

Figure 13:
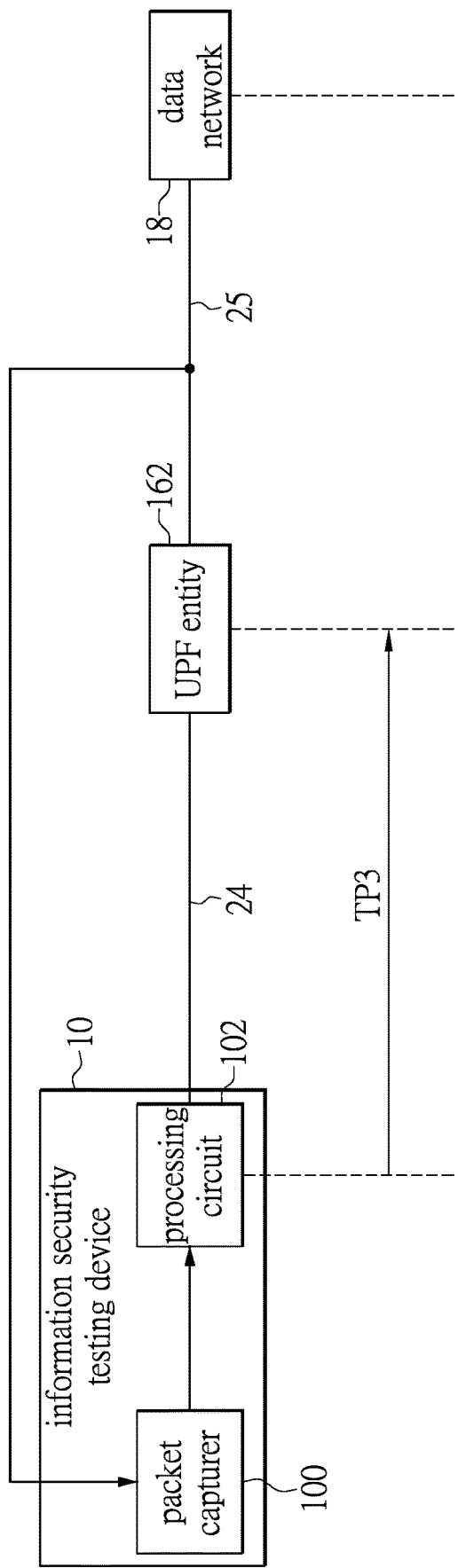
FIG. 13 is a schematic diagram of the processing circuit of the information security testing device configured to execute the third security testing procedure according to an embodiment of the present disclosure.

Therefore, the processing circuit 102 can test whether the UPF entity 162 of the core network 16 has the third security mechanism for checking the TEID, the third IP address UE_IP or the second source IP address S2_IP by tampering with the TEID, the third IP address UE_IP or the fifth IP address gNB_IP obtained by the packet capturer 100. To facilitate the following description, the TEID, the third IP address UE_IP and the fifth IP address gNB_IP obtained by the packet capturer 100 can be defined as a plurality of second test parameters. Reference is made to FIG. 13. FIG. 13 is a schematic diagram of the processing circuit of the information security testing device configured to execute the third security testing procedure according to an embodiment of the present disclosure.

As shown in FIG. 13, after tampering with one of the second test parameters, the processing circuit 102 can generate a third test packet TP3, and the content of the third test packet TP3 includes the tampered second test parameter (hereinafter referred to as the second target test parameters) and other untampered second test parameters. In addition, the processing circuit 102 may transmit the third test packet TP3 to the UPF entity 162 of the core network 16 through the fourth interface 24 (i.e., N3 interface) according to the fourth IP address UPF_IP.

Then, the processing circuit 102 can determine whether the UPF entity 162 of the core network 16 transmits the third test packet TP3 to the data network 18 through the fifth interface 25 (i.e., the N6 interface). In response to determining that the UPF entity 162 of the core network 16 does not transmit the third test packet TP3 to the data network 18 through the fifth interface 25, the processing circuit 102 may determine that the UPF entity 162 of the core network 16 has the third security mechanism for checking the second target test parameters.

Specifically, the processing circuit 102 can capture and analyze the signal transmitted on the fifth interface 25 through the packet capturer 100 to determine whether the UPF entity 162 transmits the third test packet TP3 to the data network 18 through the fifth interface 25. However, the present disclosure does not limit the specific implementation in which the processing circuit 102 determines whether the UPF entity 162 transmits the third test packet TP3 to the data network 18 through the fifth interface 25.

Figure 14:
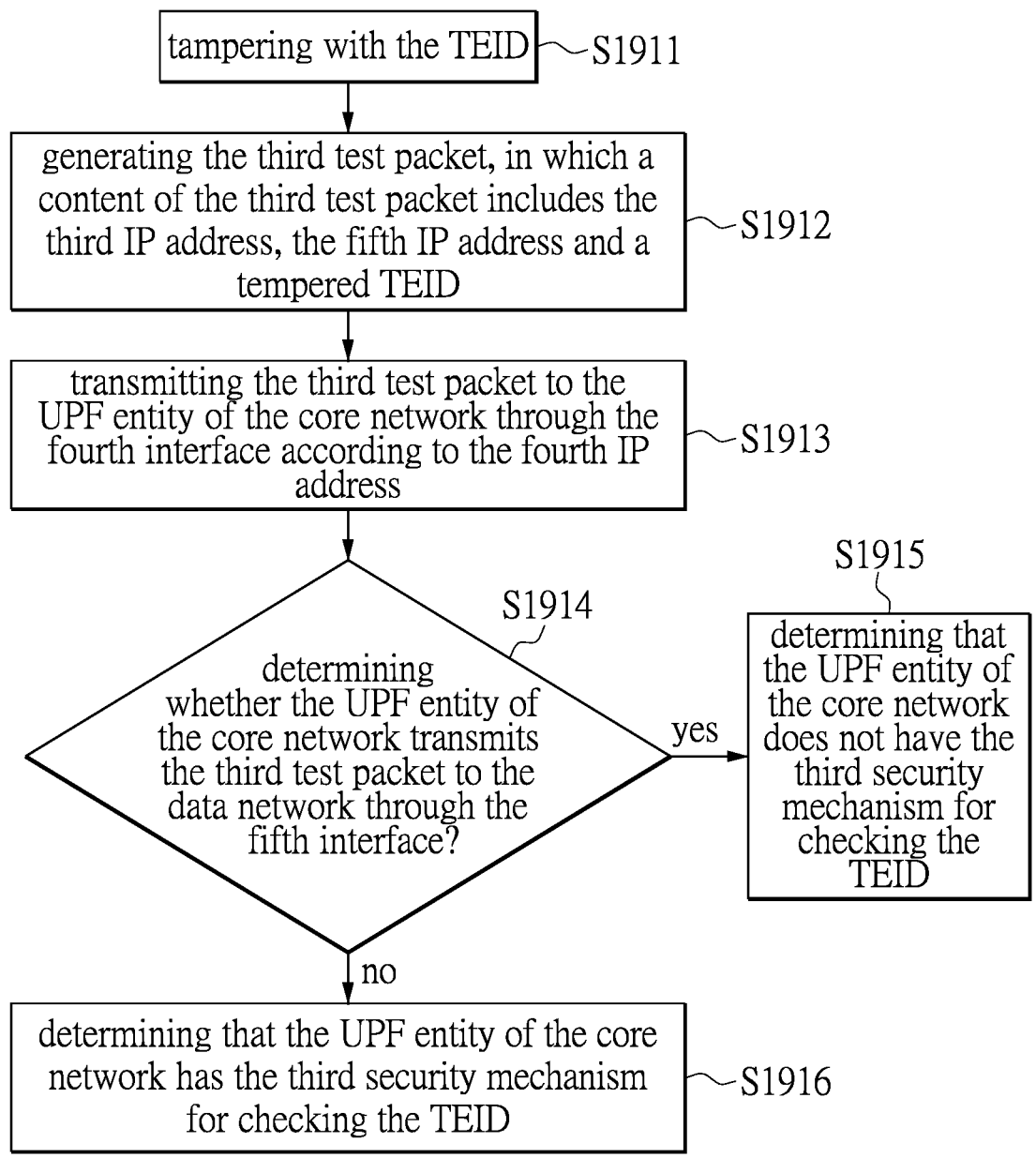
FIG. 14 is a flow chart of the third security testing procedure according to the first embodiment of the present disclosure.

Further, reference is made to FIG. 14, which is a flow chart of the third security testing procedure according to the first embodiment of the present disclosure. As shown in FIG. 14, when the processing circuit 102 chooses to tamper with the TEID obtained by the packet capturer 100, the third security testing procedure of this embodiment may include the following steps.

S1911: tampering with the TEID;
S1912: generating the third test packet, in which a content of the third test packet includes the third IP address, the fifth IP address and a tempered TEID;
S1913: transmitting the third test packet to the UPF entity of the core network through the fourth interface according to the fourth IP address;
S1914: determining whether the UPF entity of the core network transmits the third test packet to the data network through the fifth interface; if yes, the third security testing procedure of this embodiment proceeds to S1915; if not, the third security testing procedure of this embodiment proceeds to S1916.
S1915: determining that the UPF entity of the core network does not have the third security mechanism for checking the TEID; and
S1916: determining that the UPF entity of the core network has the third security mechanism for checking the TEID.

Figure 15:
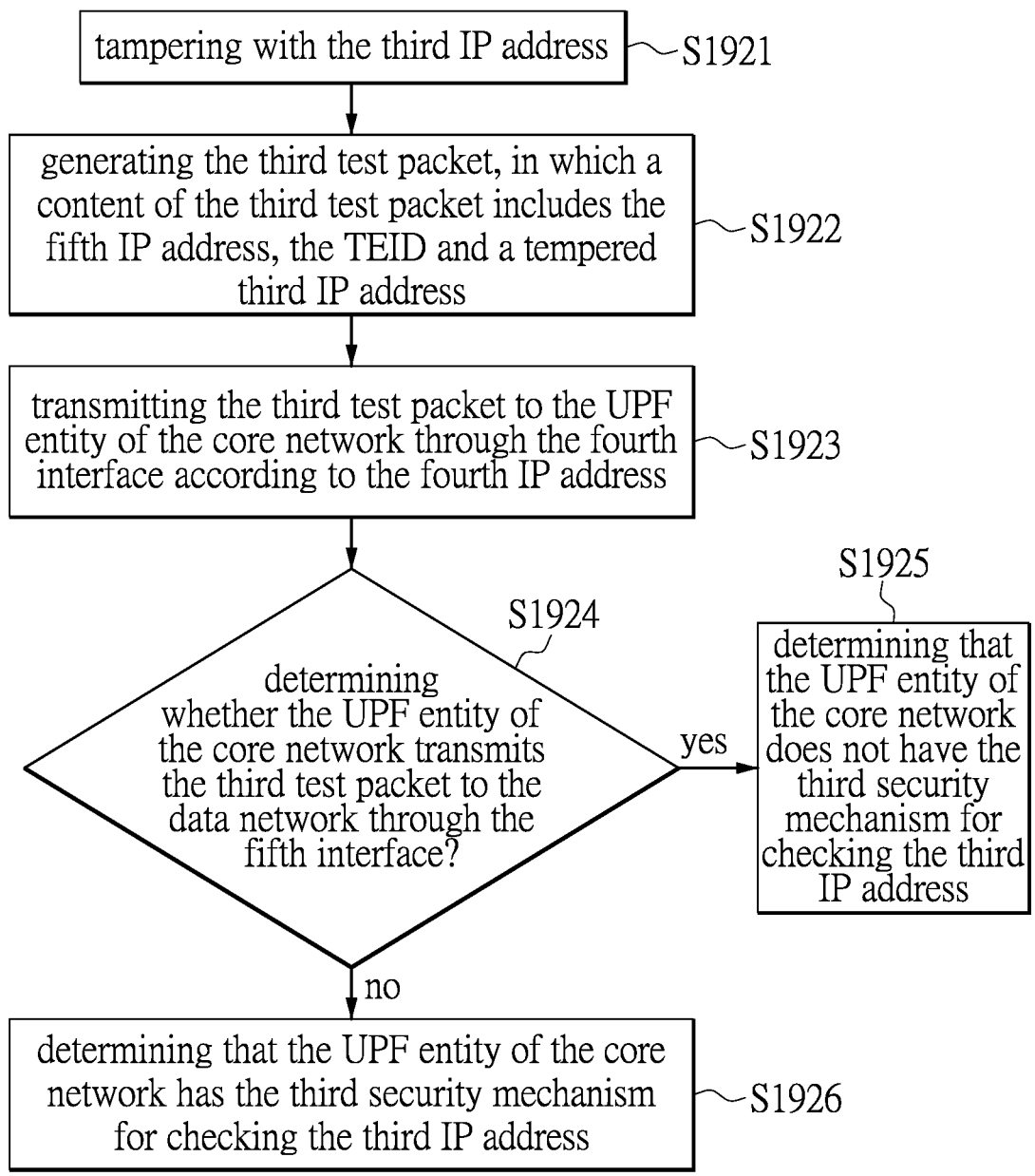
FIG. 15 is a flow chart of the third security testing procedure according to the second embodiment of the present disclosure.

In addition, reference is made to FIG. 15, which is a flow chart of the third security testing procedure of the second embodiment of the present disclosure. As shown in FIG. 15, in the case where the processing circuit 102 chooses to tamper with the third IP address UE_IP obtained by the packet capturer 100, the third security testing procedure of this embodiment may include the following steps.

S1921: tampering with the third IP address;
S1922: generating the third test packet, in which a content of the third test packet includes the fifth IP address, the TEID and a tempered third IP address;
S1923: transmitting the third test packet to the UPF entity of the core network through the fourth interface according to the fourth IP address;
S1924: determining whether the UPF entity of the core network transmits the third test packet to the data network through the fifth interface; if yes, the third security testing procedure of this embodiment enters S1925; if not, the third security testing procedure of this embodiment proceeds to S1926.
S1925: determining that the UPF entity of the core network does not have the third security mechanism for checking the third IP address; and
S1926: determining that the UPF entity of the core network has the third security mechanism for checking the third IP address.

Figure 16:
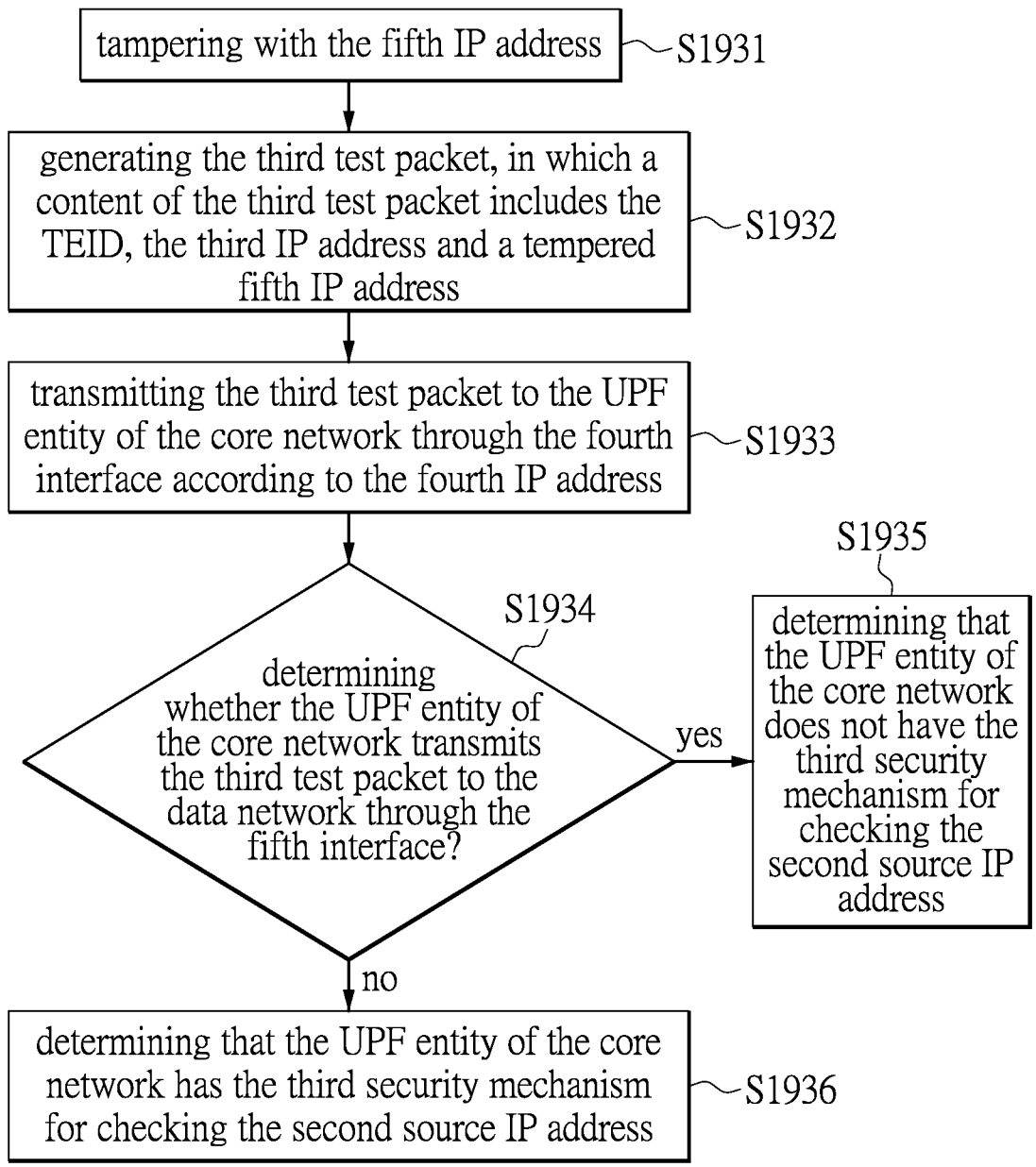
FIG. 16 is a flow chart of the third security testing procedure according to the third embodiment of the present disclosure.

Similarly, reference is made to FIG. 16, which is a flow chart of the third security testing procedure according to the third embodiment of the present disclosure. As shown in FIG. 16, in the case where the processing circuit 102 chooses to tamper with the fifth IP address gNB_IP (i.e., the second source IP address S2_IP) obtained by the packet capturer 100, the third security testing procedure of this embodiment may include the following steps.

S1931: tampering with the fifth IP address;
S1932: generating the third test packet, in which a content of the third test packet includes the TEID, the third IP address and a tempered fifth IP address;
S1933: transmitting the third test packet to the UPF entity of the core network through the fourth interface according to the fourth IP address;
S1934: determining whether the UPF entity of the core network transmits the third test packet to the data network through the fifth interface; if yes, the third security testing procedure of this embodiment enters S1935; if not, the third security testing procedure of this embodiment proceeds to S1936.

S1935: determining that the UPF entity of the core network does not have the third security mechanism for checking the second source IP address; and S1936: determining that the UPF entity of the core network has the third security mechanism for checking the second source IP address.

Similarly, in other embodiments, the processing circuit 102 may also execute the third security testing procedure of FIG. 14, FIG. 15, and FIG. 16 in turn, and then determine whether the UPF entity 162 of the core network 16 has the third security mechanism for checking the TEID, the third IP address UE_IP and the second source IP address S2_IP. Since the relevant details of FIGS. 14, 15 and 16 are the same as the above, they will not be described again.

Further, the information security testing method may also only include S140, S170, S180 and S190 to execute the information security testing on the UPF entity 162 individually. That is to say, in other embodiments, if the information security test needs to be executed only on the UPF entity 162, the information security testing device 10 can also only execute S140, S170, S180 and S190 after the user equipment 12, the base station 14 and the core network 16 establish a communication connection. Since the relevant details are the same as those mentioned above, they will not be repeated here.

To sum up, the present disclosure provides an information security testing method and an information security testing device, which can obtain the TEID and the IP address of the legitimate user by capturing and analyzing the signals transmitted on the interface, and test whether the central unit has a security mechanism for checking the TEID or the IP address through the obtained TEID and IP address. Therefore, compared with the prior art, the information security testing method and the information security testing device of the present disclosure can accelerate the testing process to improve testing efficiency, and accurately determine whether the central unit has a security mechanism for checking the TEID or the IP address. In addition, the information security testing method and the information security testing device of the present disclosure can also test the agility and integrity protection functions of the central unit, and can further execute the information security testing on the UPF entity of the core network to determine whether the UPF entity has a security mechanism for checking the TEID or the IP address.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope.

What is claimed is:

1. An information security testing method executed by an information security testing device after establishing a communication connection between a user equipment (UE), a base station and a core network, and including following steps:

obtaining a base station key from a first signaling transmitted from the core network to the base station through a first interface, and deriving at least one integrity key and at least one encryption key according to the base station key, wherein the base station includes a distributed unit (DU) and a central unit (CU), and the CU includes a control plane and a user plane;

obtaining a Tunnel End Identifier (TEID) of a General Packet Radio Service (GPRS) Tunneling Protocol (GTP) and a first internet protocol (IP) address of the user plane from a second signaling transmitted from the control plane of the CU to the DU through a second interface;

obtaining a second IP address of the DU from a third signaling transmitted from the DU to the control plane of the CU through the second interface;

obtaining a third IP address of the UE from a fourth signaling transmitted from the control plane of the CU to the DU through the second interface; and executing a first security testing procedure to generate a first test packet according to the at least one integrity key, the at least one encryption key, the TEID, the first IP address, the second IP address and the third IP address, and transmitting the first test packet to the user plane of the CU through a third interface to determine whether the CU has a first security mechanism for checking the TEID, the third IP address or a first source IP address.

2. The information security testing method according to claim 1, wherein the first security testing procedure includes:

tampering with the TEID;

generating the first test packet having encryption and integrity protection according to the at least one integrity key and the at least one encryption key, wherein a content of the first test packet includes the second IP address, the third IP address and a tempered TEID;

transmitting the first test packet to the user plane of the CU through the third interface according to the first IP address;

determining whether the user plane of the CU transmits the first test packet to a User Plane Function (UPF) entity of the core network through a fourth interface; and determining that the CU has the first security mechanism for checking the TEID in response to determining that the user plane of the CU does not transmit the first test packet to the UPF entity of the core network through the fourth interface.

3. The information security testing method according to claim 1, wherein the first security testing procedure includes:

tampering with the third IP address;

generating the first test packet having encryption and integrity protection according to the at least one integrity key and the at least one encryption key, wherein a content of the first test packet includes the second IP address, the TEID and a tempered third IP address;

transmitting the first test packet to the user plane of the CU through the third interface according to the first IP address;

determining whether the user plane of the CU transmits the first test packet to a UPF entity of the core network through a fourth interface; and determining that the CU has the first security mechanism for checking the third IP address of the UE in response to determining that the user plane of the CU does not transmit the first test packet to the UPF entity of the core network through the fourth interface.

4. The information security testing method according to claim 1, wherein the first security testing procedure includes:
tampering with the second IP address;
generating the first test packet having encryption and integrity protection according to the at least one integrity key and the at least one encryption key, wherein a content of the first test packet includes the TEID, the third IP address and a tampered second IP address;
transmitting the first test packet to the user plane of the CU through the third interface according to the first IP address;
determining whether the user plane of the CU transmits the first test packet to a UPF entity of the core network through a fourth interface; and
determining that the CU has the first security mechanism for checking the first source IP address in response to determining that the user plane of the CU does not transmit the first test packet to the UPF entity of the core network through the fourth interface.

5. The information security testing method according to claim 1, further including:
executing a second security testing procedure to generate a second test packet according to the at least one integrity key, the at least one encryption key, the TEID, the first IP address, the second IP address and the third IP address, and transmitting the second test packet to the user plane of the CU through the third interface to determine whether the CU has a second security mechanism for executing encryption protection or integrity protection.

6. The information security testing method according to claim 5, wherein the second security testing procedure includes:
generating the second test packet having encryption and non-integrity protection according to the at least one integrity key and the at least one encryption key, wherein a content of the second test packet includes the second IP address, the TEID and the third IP address;
transmitting the second test packet to the user plane of the CU through the third interface according to the first IP address;
determine whether the user plane of the CU transmits the second test packet to a UPF entity of the core network through a fourth interface; and
determine that the CU has the second security mechanism for executing integrity protection in response to determining that the user plane of the CU does not transmit the second test packet to the UPF entity of the core network through the fourth interface.

7. The information security testing method according to claim 5, wherein the second security testing procedure includes:
generating the second test packet having non-encryption and integrity protection according to the at least one integrity key and the at least one encryption key, wherein a content of the second test packet includes the second IP address, the TEID and the third IP address;
transmitting the second test packet to the user plane of the CU through the third interface according to the first IP address;
determine whether the user plane of the CU transmits the second test packet to a UPF entity of the core network through a fourth interface; and
determine that the CU has the second security mechanism for executing encryption protection in response to determining that the user plane of the CU does not transmit the second test packet to the UPF entity of the core network through the fourth interface.

8. The information security testing method according to claim 5, further including:
obtaining the TEID and a fourth IP address of a UPF entity of the core network from a fifth signaling transmitted from the core network to the base station through the first interface;
obtaining a fifth IP address of the base station from a sixth signaling transmitted from the base station to the core network through the first interface; and
executing a third security testing procedure to generate a third test packet according to the TEID, the third IP address, the fourth IP address and the fifth IP address and transmitting the third test packet to the UPF entity of the core network through a fourth interface to determine whether the UPF entity of the core network has a third security mechanism for checking the TEID, the third IP address or a second source IP address.

9. The information security testing method according to claim 8, wherein the third security testing procedure includes:
tampering with the TEID;
generating the third test packet, wherein a content of the third test packet includes the third IP address, the fifth IP address and a tempered TEID;
transmitting the third test packet to the UPF entity of the core network through the fourth interface according to the fourth IP address;
determining whether the UPF entity of the core network transmits the third test packet to a data network through a fifth interface; and
determining that the UPF entity of the core network has the third security mechanism for checking the TEID in response to determining that the UPF entity of the core network does not transmit the third test packet to the data network through the fifth interface.

10. The information security testing method according to claim 8, wherein the third security testing procedure includes:
tampering with the third IP address;
generating the third test packet, wherein a content of the third test packet includes the fifth IP address, the TEID and a tempered third IP address;
transmitting the third test packet to the UPF entity of the core network through the fourth interface according to the fourth IP address;
determining whether the UPF entity of the core network transmits the third test packet to a data network through a fifth interface; and
determining that the UPF entity of the core network has the third security mechanism for checking the third IP address in response to determining that the UPF entity of the core network does not transmit the third test packet to the data network through the fifth interface.

11. The information security testing method according to claim 8, wherein the third security testing procedure includes:
tampering with the fifth IP address;

generating the third test packet, wherein a content of the third test packet includes the TEID, the third IP address and a tempered fifth IP address;

transmitting the third test packet to the UPF entity of the core network through the fourth interface according to the fourth IP address;

determining whether the UPF entity of the core network transmits the third test packet to a data network through a fifth interface; and determining that the UPF entity of the core network has a third security mechanism for checking the second source IP address in response to determining that the UPF entity of the core network does not transmit the third test packet to the data network through the fifth interface.

12. An information security testing device, including:

a packet capturer configured to execute following steps after establishing a communication connection between a user equipment (UE), a base station and a core network:

obtaining a base station key from a first signaling transmitted from the core network to the base station through a first interface, and deriving at least one integrity key and at least one encryption key according to the base station key, wherein the base station includes a distributed unit (DU) and a central unit (CU), and the CU includes a control plane and a user plane;

obtaining a Tunnel End Identifier (TEID) of a General Packet Radio Service (GPRS) Tunneling Protocol (GTP) and a first internet protocol (IP) address of the user plane from a second signaling transmitted from the control plane of the CU to the DU through a second interface;

obtaining a second IP address of the DU from a third signaling transmitted from the DU to the control plane of the CU through the second interface;

obtaining a third IP address of the UE from a fourth signaling transmitted from the control plane of the CU to the DU through the second interface; and a processing circuit coupled to the packet capturer and configured to execute a first security testing procedure to generate a first test packet according to the at least one integrity key, the at least one encryption key, the TEID, the first IP address, the second IP address and the third IP address and transmitting the first test packet to the user plane of the CU through a third interface to determine whether the CU has a first security mechanism for checking the TEID and the third IP address or a first source IP address.

13. The information security testing device according to claim 12, wherein the first security testing procedure includes:

tampering with the TEID;

generating the first test packet having encryption and integrity protection according to the at least one integrity key and the at least one encryption key, wherein a content of the first test packet includes the second IP address, the third IP address and a tempered TEID;

transmitting the first test packet to the user plane of the CU through the third interface according to the first IP address;

determining whether the user plane of the CU transmits the first test packet to a user plane function (UPF) entity of the core network through a fourth interface; and determining that the CU has the first security mechanism for checking the TEID in response to determining that the user plane of the CU does not transmit the first test packet to the UPF entity of the core network through the fourth interface.

14. The information security testing device according to claim 12, wherein the first security testing procedure includes:

tampering with the third IP address;

generating the first test packet having encryption and integrity protection according to the at least one integrity key and the at least one encryption key, wherein a content of the first test packet includes the second IP address, the TEID and a tempered third IP address;

transmitting the first test packet to the user plane of the CU through the third interface according to the first IP address;

determining whether the user plane of the CU transmits the first test packet to a UPF entity of the core network through a fourth interface; and determining that the CU has the first security mechanism for checking the third IP address of the UE in response to determining that the user plane of the CU does not transmit the first test packet to the UPF entity of the core network through the fourth interface.

15. The information security testing device according to claim 12, wherein the first security testing procedure includes:

tampering with the second IP address;

generating the first test packet having encryption and integrity protection according to the at least one integrity key and the at least one encryption key, wherein a content of the first test packet includes the TEID, the third IP address and a tempered second IP address;

transmitting the first test packet to the user plane of the CU through the third interface according to the first IP address;

determining whether the user plane of the CU transmits the first test packet to a UPF entity of the core network through a fourth interface; and determining that the CU has the first security mechanism for checking the first source IP address in response to determining that the user plane of the CU does not transmit the first test packet to the UPF entity of the core network through the fourth interface.

16. The information security testing device according to claim 12, wherein the processing circuit is further configured to execute a second security testing procedure to generate a second test packet according to the at least one integrity key, the at least one encryption key, the TEID, the first IP address, the second IP address and the third IP address, and transmit the second test packet to the user plane of the CU through the third interface to determine whether the CU has a second security mechanism for executing encryption protection or integrity protection.

17. The information security testing device according to claim 16, wherein the second security testing procedure includes:

generating the second test packet having encryption and non-integrity protection according to the at least one integrity key and the at least one encryption key, wherein a content of the second test packet includes the second IP address, the TEID and the third IP address;

transmitting the second test packet to the user plane of the CU through the third interface according to the first IP address;

determine whether the user plane of the CU transmits the second test packet to a UPF entity of the core network through a fourth interface; and determine that the CU has the second security mechanism for executing integrity protection in response to determining that the user plane of the CU does not transmit the second test packet to the UPF entity of the core network through the fourth interface.

18. The information security testing device according to claim 16, wherein the second security testing procedure includes:
- generating the second test packet having non-encryption and integrity protection according to the at least one integrity key and the at least one encryption key, wherein a content of the second test packet includes the second IP address, the TEID and the third IP address;
- transmitting the second test packet to the user plane of the CU through the third interface according to the first IP address;
- determining whether the user plane of the CU transmits the second test packet to a UPF entity of the core network through a fourth interface; and
- determining that the CU has the second security mechanism for executing encryption protection in response to determining that the user plane of the CU does not transmit the second test packet to the UPF entity of the core network through the fourth interface.

19. The information security testing device according to claim 16, wherein the packet capturer is further configured to execute following steps:
- obtaining the TEID and a fourth IP address of a UPF entity of the core network from a fifth signaling transmitted from the core network to the base station through the first interface;
- obtaining a fifth IP address of the base station from a sixth signaling transmitted from the base station to the core network through the first interface; and
- wherein the processing circuit is further configured to execute a third security testing procedure to generate a third test packet according to the TEID, the third IP address, the fourth IP address and the fifth IP address and transmit the third test packet to the UPF entity of the core network through a fourth interface to determine whether the UPF entity of the core network has a third security mechanism for checking the TEID, the third IP address or a second source IP address.

20. The information security testing device according to claim 19, wherein the third security testing procedure includes:
- tampering with the TEID;
- generating the third test packet, wherein a content of the third test packet includes the third IP address, the fifth IP address and a tempered TEID;
- transmitting the third test packet to the UPF entity of the core network through the fourth interface according to the fourth IP address;
- determining whether the UPF entity of the core network transmits the third test packet to a data network through a fifth interface; and
- determining that the UPF entity of the core network has the third security mechanism for checking the TEID in response to determining that the UPF entity of the core network does not transmit the third test packet to the data network through the fifth interface.

21. The information security testing device according to claim 19, wherein the third security testing procedure includes:
- tampering with the third IP address;
- generating the third test packet, wherein a content of the third test packet includes the fifth IP address, the TEID and a tempered third IP address;
- transmitting the third test packet to the UPF entity of the core network through the fourth interface according to the fourth IP address;
- determining whether the UPF entity of the core network transmits the third test packet to a data network through a fifth interface; and
- determining that the UPF entity of the core network has the third security mechanism for checking the third IP address in response to determining that the UPF entity of the core network does not transmit the third test packet to the data network through the fifth interface.

22. The information security testing device according to claim 19, wherein the third security testing procedure includes:
- tampering with the fifth IP address;
- generating the third test packet, wherein a content of the third test packet includes the TEID, the third IP address and a tempered fifth IP address;
- transmitting the third test packet to the UPF entity of the core network through the fourth interface according to the fourth IP address;
- determining whether the UPF entity of the core network transmits the third test packet to a data network through a fifth interface; and
- determining that the UPF entity of the core network has a third security mechanism for checking the second source IP address in response to determining that the UPF entity of the core network does not transmit the third test packet to the data network through the fifth interface.

* * * * *